W. McQ. SAUNDERS.
QUICK DETACHABLE HOSE COUPLING.
APPLICATION FILED APR. 22, 1916.
1,230,606.
Patented June 19, 1917.
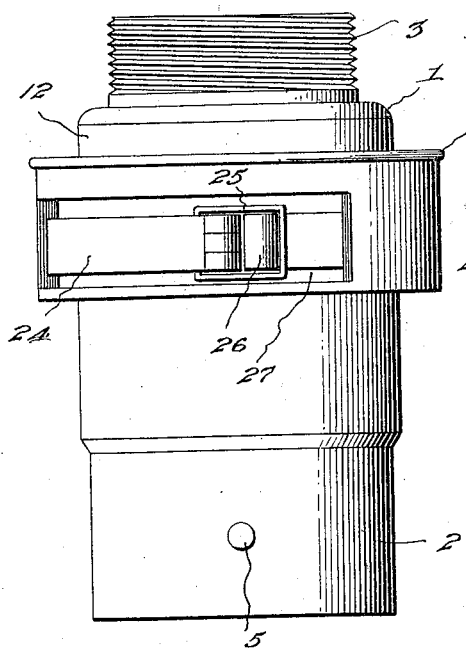
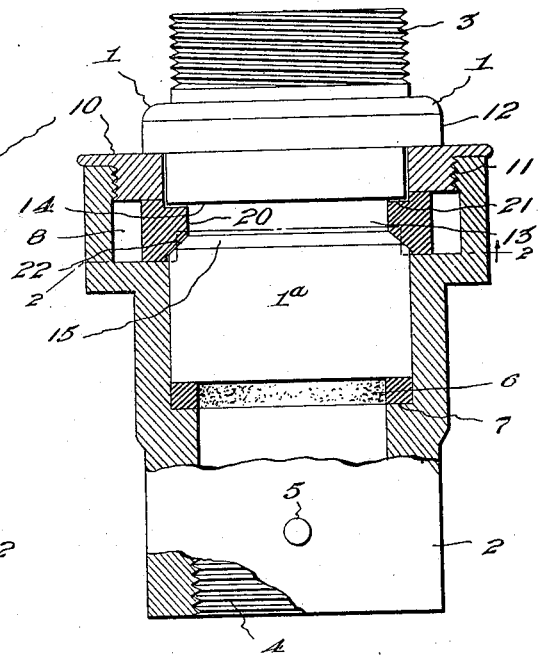
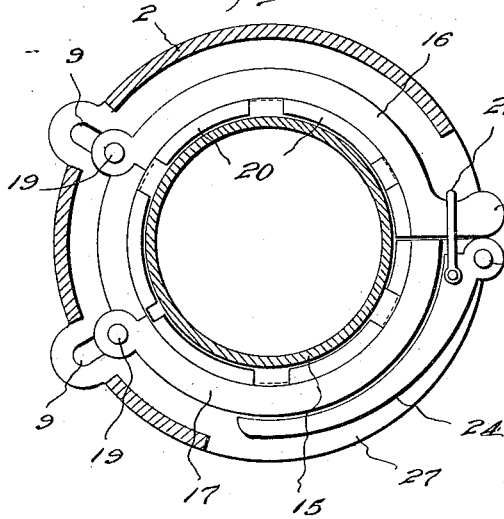
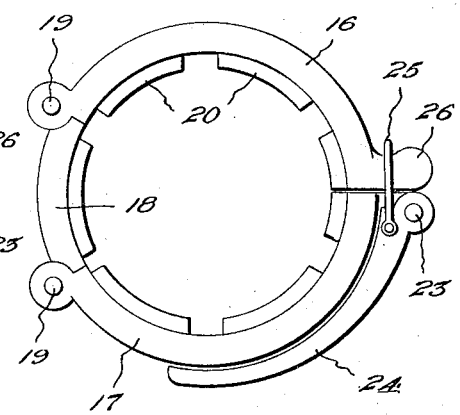

UNITED STATES PATENT OFFICE.

WILLIAM McQUIGG SAUNDERS, OF EVANSVILLE, INDIANA.

QUICK-DETACHABLE HOSE-COUPLING.

1,230,606.  Specification of Letters Patent.  Patented June 19, 1917.

Application filed April 22, 1916. Serial No. 92,878.

*To all whom it may concern:*

Be it known that I, WILLIAM McQUIGG SAUNDERS, a citizen of the United States, residing at Evansville, county of Vanderburg, and State of Indiana, have invented certain new and useful Improvements in Quick-Detachable Hose-Couplings, of which the following is a specification.

This invention relates to quick detachable hose couplings.

My object is to provide a novel, quick detachable coupling adapted for use in connection with fire hose, but which may be used on hose of any other character.

In carrying out my invention I provide coupling heads or members, one adapted to enter the other, preferably with interposed gasket, and a novel coupling or clamping collar coöperating with the aforesaid coupling members and preferably contained within one of them and operable from the exterior thereof.

With the construction specified, I preferably employ a locking cam lever and bail by which there may be a quick clamping or releasing of the collar to cause it to connect or couple on the coupling members and quickly releasable to permit them to be separated. The coupling collar is of improved construction and coöperates in a novel manner with both coupling members to draw them together and to hold them in coupled condition.

The embodiment of the invention which is set forth hereinafter is to be considered as illustrative of the principle thereof and not restrictive of the scope of the invention, which is susceptible of modification without departing from the essential principle thereof.

In the accompanying drawings:

Figure 1 is a plan view showing the coupling in connected condition;

Fig. 2, a cross section on line 2—2, Fig. 3;

Fig. 3, a horizontal section; and

Fig. 4, a detail view of the coupling collar.

The coupling heads or members 1 and 2 are adapted for reception, one within the other, and one of them may have external screw-threads 3, and the other internal screw-threads 4, as usual. Lugs 5 may be provided for the use of a spanner. The member 2 preferably contains a gasket 6 on an internal shoulder 7 thereof, said gasket being preferably compressible. The member 2 is enlarged and provided with a chamber 8 and it also has radial slots 9. The chamber 8 is closed by a flange cap 10 detachably connected to the head 2 by screw-threads 11. The flange 12 of the head 1 may bear upon the cap 10. The entrant portion $1^a$ of the head 1 is adapted to snugly, yet easily, fit within the member 2 and to bear upon the gasket 6, there being sufficient clearance between the collar 12 and the cap 10 to permit a tight fit of the part $1^a$ against said gasket 6 when the parts are locked together, as will presently appear. The entrant portion $1^a$ is provided with an annular exterior groove or channel 13, which is provided with an abrupt shoulder 14 and an inclined or beveled shoulder 15, the groove 13 being disposed opposite the chamber 8 when the parts are fitted together.

For detachably coupling the heads 1 and 2 together, I provide an improved coupling collar shown in detail in Fig. 4 and comprising the yokes 16 and 17 and the connecting piece 18 which is pivoted to the yokes at 19. The collar is contained within the chamber 8 and interposed between the head 2 and the cap 10, and it is provided with inwardly projecting lugs 20 which are of the cross sectional shape appearing in Fig. 3, said lugs substantially conforming in outline to the walls of the channel or groove 13 and comprising a square shoulder 21 adapted to abut the shoulder 14, and an inclined or cam shoulder 22 adapted to bear on the annular beveled or inclined shoulder 15. Pivoted to one of the yoke members, such as 17 for instance, at the point 23, is a lever 24 which is preferably curved to conform to the exterior of the yoke member 17 when the lever is closed. The lever 24 carries a bail 25 which is adapted to swing over and engage the head 26 on the yoke member 16 when the lever 24 is closed, as in Fig. 2, thereby drawing the bail 25 tightly against the head 26 and clamping the yoke members 16 and 17 and the connecting member 18 around the portion $1^a$ of the coupling head 1, such action causing the cam faces 22 of the lugs 20 to bear against the cam or inclined shoulder 15 and to force the portion $1^a$ against the gasket 6, which is preferably compressible to cause a tight fit to be thus obtained between the heads 1 and 2. Such inward forcing of the part 19 results because the cap 10 constitutes an abutment for the faces of the yoke members 16 and 17 and the member 18. There is provided in the coupling head 2 a slot 27 which exposes the lever 24 and in which said lever lies, as also the bail 25 and head 26, enabling easy manipulation of these parts and quick clamping or release of the coupling collar. The slots 9 receive the pivots 19 and guide them to permit the necessary lateral shifting or expansion of the coupling collar such as will be necessary to disengage the lugs 20 from the shoulders 14 and 15 to permit removal of the part 1$^a$ from within the coupling head 2.

Having thus described my invention, what I claim as new and desire to secure by Letters Patent, is:—

1. In a quick detachable hose coupling, the combination with coupling heads adapted to fit one within the other, of an expansible and contractible coupling collar comprising jointed sections loosely contained within and bodily movable inside of one of said heads and operable from the exterior thereof, which is adapted to engage the other head to lock said heads together.

2. In a quick detachable hose coupling, the combination of coupling heads adapted to be received one within the other, the entrant head being provided with an external groove or channel, and an expansible and contractible coupling collar comprising jointed sections loosely contained within and bodily movable inside of the other coupling head and operable from the exterior thereof, which is adapted to fit into said groove or channel to lock the coupling heads together.

3. In a quick detachable hose coupling, the combination with coupling heads adapted to fit one within the other, of an expansible and contractible coupling collar comprising jointed sections loosely contained within and bodily movable inside of one of said heads and operable from the exterior thereof, which is adapted to engage the other head to lock said heads together, and a removable cap for the outer coupling head which serves as an abutment for the said coupling collar.

4. In a quick detachable hose coupling, the combination of coupling heads adapted for reception one within the other, the entrant head being provided with an external groove or channel having a shoulder and also an inclined or cam surface, of a jointed expansible and contractible coupling collar loosely contained within the other coupling head and provided with projecting portions receivable in the groove or channel and having shoulders or faces adapted to coöperate with the shoulder and cam surface aforesaid and operating means for opening and closing said jointed coupling collar.

5. In a quick detachable hose coupling, the combination of coupling heads adapted for reception one within the other, the entrant head being provided with an external groove or channel having a shoulder and also an inclined or cam surface, of a jointed expansible and contractible coupling collar loosely contained within the other coupling head and provided with projecting portions receivable in the groove or channel and having shoulders or faces adapted to coöperate with the shoulder and cam surface aforesaid, said outer coupling head having an opening exposing the operating means for the expansible and contractible collar aforesaid.

6. In a quick detachable hose coupling, the combination of coupling heads adapted for reception one within the other, one of said heads being provided with a chamber and a detachable cap closing said chamber, and the other, or entrant, head having an exterior annular groove or channel provided with a shoulder and with a cam or inclined surface, of a coupling collar comprising members hinged or pivoted together which are loosely contained within the coupling heads and adapted for expansion and contraction and are provided with portions entering and substantially conforming to the groove or channel and the shoulder and cam surface thereof, said coupling head which contains the coupling collar being provided with an opening, and means for operating said coupling collar to expand or contract the same which is exposed through said opening.

7. In a quick detachable hose coupling, the combination of coupling heads adapted for reception one within the other, one of said heads being provided with a chamber and a detachable cap closing said chamber, and the other, or entrant, head having an exterior annular groove or channel provided with a shoulder and with a cam or inclined surface, of a coupling collar comprising members hinged or pivoted together which are adapted for expansion and contraction and are provided with portions entering and substantially conforming to the groove or channel and the shoulder and cam surface thereof, a lever pivoted to one of the parts of the coupling collar and provided with a bail adapted to engage the other part thereof, guiding means on the coupling head which guide the sections of the coupling collar when they are expanding and contracting, said coupling head which contains the coupling collar being provided with an opening which exposes the lever and bail so that they may be operated from the exterior of the coupling without detaching the cap.

In testimony whereof, I hereunto affix my signature.

WM. McQUIGG SAUNDERS.